(12) United States Patent
Douglas et al.

(10) Patent No.: US 10,838,585 B1
(45) Date of Patent: Nov. 17, 2020

(54) INTERACTIVE CONTENT ELEMENT PRESENTATION

(71) Applicant: Amazon Technologies, Inc., Reno, NV (US)

(72) Inventors: Alexander Grant Douglas, Seattle, WA (US); Muneer Mirza, Bellevue, WA (US); Charles H. Bell, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 126 days.

(21) Appl. No.: 15/719,505

(22) Filed: Sep. 28, 2017

(51) Int. Cl.
*G06F 3/00* (2006.01)
*G06F 17/00* (2019.01)
*G06F 3/0482* (2013.01)
*G06F 16/958* (2019.01)
*G06F 40/14* (2020.01)

(52) U.S. Cl.
CPC .......... *G06F 3/0482* (2013.01); *G06F 16/958* (2019.01); *G06F 40/14* (2020.01)

(58) Field of Classification Search
CPC .......................... G06F 3/04842; G06F 16/958
USPC ......................................... 715/747, 200, 234
See application file for complete search history.

(56) References Cited

U.S. PATENT DOCUMENTS

| | | | |
|---|---|---|---|
| 6,256,631 B1 * | 7/2001 | Malcolm | G06F 16/9558 |
| 7,020,609 B2 * | 3/2006 | Thrift | H04M 3/4938 |
| | | | 704/270.1 |
| 7,640,240 B2 * | 12/2009 | Boal | G06Q 30/0207 |
| 7,801,893 B2 * | 9/2010 | Gulli' | G06F 17/30247 |
| | | | 707/737 |
| 7,860,895 B1 * | 12/2010 | Scofield | G06F 17/30864 |
| | | | 707/713 |
| 7,966,564 B2 * | 6/2011 | Catlin | G06F 17/30867 |
| | | | 715/745 |
| 8,131,767 B2 * | 3/2012 | Brindley | G06F 3/0487 |
| | | | 707/791 |
| 8,769,017 B2 * | 7/2014 | Jakobson | G06Q 50/01 |
| | | | 709/204 |
| 9,195,640 B1 * | 11/2015 | Donneau-Golencer | |
| | | | G06F 17/28 |
| 9,262,518 B2 * | 2/2016 | Chandraghatgi | G06Q 30/0277 |
| 9,690,786 B2 * | 6/2017 | Berry | G06F 16/48 |
| 2005/0060643 A1 * | 3/2005 | Glass | G06F 17/241 |
| | | | 715/205 |

(Continued)

*Primary Examiner* — Manglesh M Patel
(74) *Attorney, Agent, or Firm* — Hogan Lovells US LLP

(57) ABSTRACT

A system configured to determine interactive elements for non-traditional computing devices is disclosed. The system receives a portion of a webpage with a first interactive element and an element identifier. The system determines that a threshold number of interactive actions are associated with a second interactive element in a data store. The threshold number of interactive actions indicates that the second interactive element is selectable to perform an action in response to an interaction by a user. The system determines that the first interactive element is similar to the second interactive element by a similarity measure. The system provides to a computer, a selectable option associated with the element identifier of the first interactive element. The selectable option is for selection by an indirect input to the computer and for causing the action associated with the first interactive element upon the selection of the selectable option.

20 Claims, 9 Drawing Sheets

(56) References Cited

U.S. PATENT DOCUMENTS

| | | | | |
|---|---|---|---|---|
| 2006/0085766 | A1* | 4/2006 | Dominowska | G06F 17/30873 |
| | | | | 715/854 |
| 2010/0125816 | A1* | 5/2010 | Bezos | G06F 3/013 |
| | | | | 715/863 |
| 2012/0324008 | A1* | 12/2012 | Werz, III | G06Q 30/02 |
| | | | | 709/204 |
| 2013/0047100 | A1* | 2/2013 | Kroeger | G06F 3/0488 |
| | | | | 715/760 |
| 2013/0091150 | A1* | 4/2013 | Jin | G06F 17/30864 |
| | | | | 707/749 |
| 2013/0151944 | A1* | 6/2013 | Lin | G06F 3/0488 |
| | | | | 715/234 |

* cited by examiner

INTERACTIVE CONTENT ELEMENT PRESENTATION

BACKGROUND

Electronic devices configured for network access often rely on their ability to navigate and interact with content (e.g., content loaded from the internet) based on user input. For example, the use of a web browser to render content also allows a user to determine types of content, such as regular text and media, or interactive content by visually reviewing the displayed content. For example, interactive content may include clickable content that may be indicated to a user by a change in cursor shape or by differently colored text when the cursor hovers over clickable content. Alternatively, the existence of a cursor allows a user to determine interactive content by selecting to click over an element using a mouse. In certain instances, however, where the content features rich media, with different colors and highlights, or dynamic presentations, the reliance on colored text or cursor actions fail. Further, advances in electronic devices have resulted in a variety of input types for the human-machine interfaces, including many that do not display a cursor for interaction with the content. Such advances have resulted in non-traditional electronic devices (or traditional electronic devices with a non-traditional input mode) that do not solely rely on keyboards, touchscreens, and mice to be able to interact with the content. Such electronic devices may not have cursor indications for clickable content. Such advances in electronic devices raise new issues that are computer and network specific.

BRIEF DESCRIPTION OF THE DRAWINGS

Various embodiments in accordance with the present disclosure will be described with reference to the drawings, in which.

DETAILED DESCRIPTION

Figure 1A:
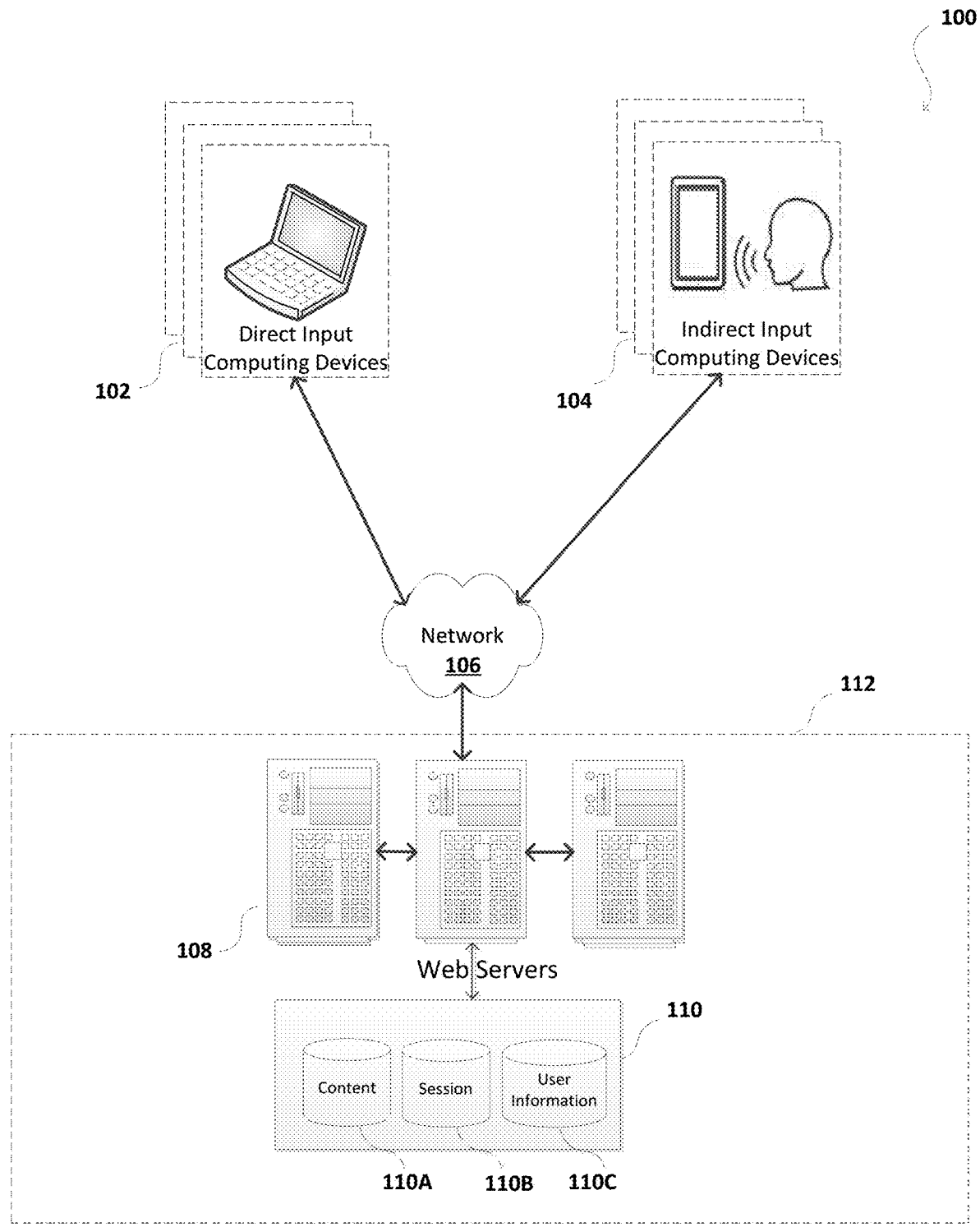
FIG. 1A illustrates an example system architecture for requesting and receiving content (e.g., webpages) for different types of computing devices from remote servers (e.g., cloud web servers functioning in a provider environment), in accordance with the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the foregoing or other deficiencies experienced in conventional approaches for displaying content. In particular, various approaches provide for presenting interactive content (e.g., internet content, including webpages; local content; and local network content) to users of computing devices which may not provide for cursor indications for hyperlinked media or programmatically interactive media. Such interactive content may include interface elements such as clickable links, clickable media, dynamic media, or any webpage element that is programmatically determined as clickable/interactive. These interface elements are also referred to as webpage elements. The computing devices which may not provide cursor indications or which may not be able to programmatically determine clickable/interactive webpage elements are also referred to as non-traditional computing devices (or indirect input computing devices) and may rely on indirect input for interacting with content. Indirect inputs include voice commands, air actions, remote control inputs, or optical inputs, to interact with these interface elements. Examples of such computing devices include devices with the Amazon Echo® and Amazon Alexa® input interfaces, as well as smart glass, smart rings, smart watches, and other similar devices. In accordance with various embodiments, approaches provide for enabling users of such indirect input computing devices to recognize and interact with interface elements that are interactive elements even in the absence of a cursor or a programmatic determination for indicating the presence of hyperlinked or interactive media.

Various embodiments provide for identifying interactive elements in content, such as a webpage, and for using information indicative of the interactive elements to recognize substantially similar elements presented on an indirect input computing device or other such device. For example, an aspect of the disclosure uses a similarity measure for a received interface element of the content with respect to stored interactive elements from a data store. In an embodiment, the stored interactive elements are previously determined as being interactive by tracking user interactions of previously displayed interface elements on direct input computing devices. The user tracking, in one example, includes providing a server to receive a notification of a user interaction or to receive the user interaction itself. The user tracking on the server uses at least a count of the user interactions for each displayed interface element, where the user interactions are by direct inputs (e.g., touchscreen, keyboard, or mouse inputs) provided to the direct input computing devices. Further, tracking and incrementing a count may be processed on one or more servers or is distributed across servers to ensure robust determination of an interactive element. When the count is at or exceeds a threshold number of interactions for a previously displayed interface element, then the previously displayed interface element is deemed an interactive element and is stored in the data store of an application server for future reference. As a result, there is a high level of certainty that the stored interactive elements are user interactive because the count relies on a user having physically interacted with the interface element using a mouse and a cursor to select an interactive element and have a web action performed in response to the selection. The terms interaction and user interaction are used interchangeably to mean user interactions in this disclosure. Web action refers to an application action programmed to occur in response to a user interaction.

Subsequently, when content is intended for an indirect input computing device, its interface elements are provided to the application server with access to the data store. The received interface elements in the application server are evaluated by a similarity measure against the stored interactive elements. Upon achieving a threshold similarity measure indicating a similarity between a received interface element and one of the stored interactive elements, a determination is made that the received interface element is interactive. A selectable option, for example a selectable identifier or descriptor, that is associated with the received interface element, is then provided to the indirect input computing device. A user of the indirect input computing device may then select the selectable identifier or descriptor by an indirect input and the selection of the selectable identifier or descriptor enables an action associated with the received interface element in the indirect input computing device. In an example, the action may be a web action for: providing inputs on an internet-enabled application; initiating or transforming media; a selection of a hyperlink to external webpages; a selection of a hyperlink to a section within the webpage; a selection for a web button; a selection for a cursor action; a selection for a navigation action; an input for text; and a selection for data transfer.

In an example, the selectable identifier or descriptor may provide displayed clues (or codes) like a number, a name, or an alphabetical character that, each, correspond to an interface element that has been identified as an interactive element by the application server. A user may then select, using a voice command corresponding to the displayed clues, one of the number the name, or the alphabetical character. In another example, the selectable identifier or descriptor may be vocal clues recited by the indirect input computing device—then a corresponding voice command response may be provided to select from the vocal clues. In yet another example, the selectable identifier or descriptor may be colored buttons displayed or projected from the indirect input computing device—then an air action or optical input response may be provided to select a relevant colored button. In a further example, the clues or buttons are displayed as overlapping the interactive element, adjacent to the interactive element, or as visual feedback that corresponds to the interactive element.

Upon selection of the selectable identifier or descriptor by a voice command, an air action, or optical input, the web action associated with the interactive element in the webpage is enabled. In an example, a webpage recognized as including interactive elements is provided to an indirect input computing device as the regular webpage with an add-on webpage (e.g., a pop-up or a menu page) that provides a listing of the interactive elements. Alternatively, the webpage, when recognized as including interactive elements, is provided to an indirect input computing device in a modified form with the interactive elements modified to provide the clues or buttons as overlapping each interactive element, adjacent to each interactive element, or as visual feedback that corresponds to each interactive element.

FIG. 1A illustrates an example system architecture 100 for requesting and receiving content for different types of computing devices, in accordance with an example of the present disclosure. The example system architecture 100 includes one or more direct input computing devices 102, such as desktops, touch tablets (with indicated cursor features or ability to programmatically determine clickable features), ultrabooks, or laptop computers running a standard operating system, as well as cellular, wireless, and handheld devices running mobile software and capable of supporting a number of networking and messaging protocols. Each of the direct input computing devices 102 includes at least a keyboard, a mouse, touchpad, or touchscreen (e.g., capacitive touchscreen or resistive touchscreen) to provide direct input to its corresponding direct input computing device 102. The direct input computing devices 102 may display a cursor or indicator to the input location on a display. In certain implementations, a touch tablet without indicated cursor features may be an indirect input computing device or may include mode-switching between an indicated cursor mode to no cursor mode for reviewing content. In an alternate implementation, a direct input computing device is defined for its ability to programmatically determine clickable features on a webpage as against indirect input computing devices which are unable to do so.

The example system architecture 100 includes one or more indirect input computing devices 104. Such indirect input computing devices 104 may include voice command input device, projection devices, augmented reality (AR) devices, virtual reality (VR) devices, optical input devices, remote voice command devices, air action devices, and remote motion transfer devices. In an example, a dongle capable of tracking hand motions is a remote motion transfer device. Such a remote motion transfer device provides remote input a receiver to indicate a user input of a corresponding user physically holding the remote motion transfer device. In a further example, a camera based receiver capable of tracking air action of hand or body gestures is an air action device. Such an air action device provides gesture input to the camera based receiver to indicate the user input of a corresponding user performing the gesture. In yet another example, a remote voice command device is a hand-held remote that receives voice commands and that relays the voice commands to a receiver to indicate the user input of a corresponding user speaking into the hand-held remote. In a further example, when a projection device is used to project a webpage to a projection medium, gestures performed to the projection is tracked by the projection device as a user input. Such a process similarly applies in the case of AR and VR devices, where a user's interaction in the AR or VR environment is captured as user input. Retina tracking devices, in another example, provides an optical input device for an indirect input computing device and allows for a receiver to relay retina tracking signs to user input corresponding to the retina motions.

In a general example, a distinction between a direct input computing device 102 and an indirect input computing device 104 is either the presence (direct input) or absence (indirect input) of an indicative cursor capable of indicating interactive elements; or the presence (direct input) or absence (indirect input) of a keyboard, mouse, and touchscreen capabilities. Further a mode switch may allow a direct input computing device to function in an indirect input mode. In such a mode, instead of using the keyboard, mouse, and touchscreen capabilities, an indirect input is activated—such as, via, voice command input, projection input, AR input, VR input, optical input, remote voice command input (as illustrated in the drawing of FIG. 1 at element 104), air action input, and remote motion transfer input. For example, a tablet computer may be used in projector mode to project a webpage on the screen. The projector feature or an associated camera feature of the tablet computer may allow a user to provide hand gestures to the projected webpage to interact with the webpage. In such an implementation, the webpage may not provide a cursor as it may be cumbersome to synchronize the indirect input (e.g., hand gestures) to the cursor location to move the cursor and perform a function. Accordingly, a user may not be able to determine interactive elements on the webpage without an indication. Accordingly, such a system allows the direct input computing device 102 and the indirect input computing device 104 to communicate with web servers 108 via network 106 to provide webpages on the display of these device, for direct input alone. The web servers 108 may be generic servers configured to process user requests and to communicate with other servers configured to provide responsive content to the computing devices 102/104. Furthermore, web server 108 may be a part of a cloud and are example cloud devices in a provider environment 112, along with data stores 110 for content 110A, session information 110B, and user information 110C.

Figure 1B:
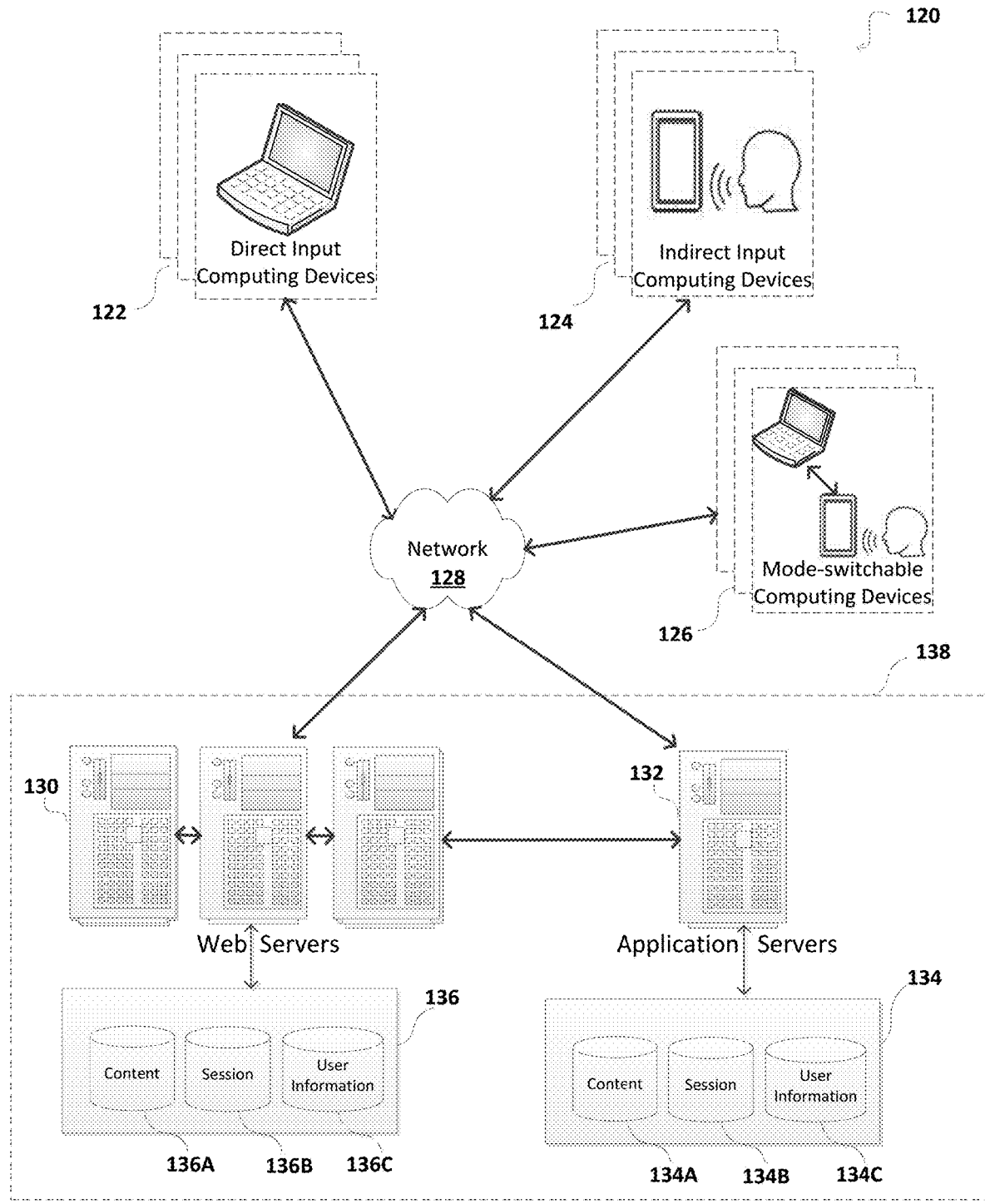
FIG. 1B illustrates an example system architecture for requesting and receiving content with additional processing for the internet content in accordance with requirements for the different types of computing devices, in an aspect of the disclosure herein.

FIG. 1B illustrates an example system architecture 120 for requesting and receiving content from web servers 128 with additional processing via application server 132 for the content, in accordance with requirements for the different types of computing devices 122/124/126, in an aspect of the disclosure herein. The present method and system is capable of either: (a) providing selectable options in the form of visual feedback that may be selected by an indirect input or (b) determining a type of a requesting device (e.g., as an indirect input computing device or as a direct input computing device), and then providing webpages with or without the selectable options. Selection of any one of the selectable options enables a web action of the corresponding interactive element. In an example, the interactive element may be a banner, a graphic element, a frame, a header section, a footer section, a content slot, a search box, a web button, a form, a logo, a hyperlink, or a hover-activated section. Furthermore, the interactive element includes interface elements that can receive an input to invoke an action. For example, inputs such as gesture-based inputs (e.g., cursor hovering or clicks) may result in responsive actions (e.g., submit a call to present internet content, execute an application, etc.)

In FIG. 1B there may be different implementations of the present system and method. In an example, for mode switchable computing devices 126, a dedicated browser or plugin (for a regular browser) that is capable of performing the above distinction of a direct or indirect input computing device is provided in a computing device capable of both direct and indirect inputs. When the appropriate mode is active (i.e., either indirect or direct input), then the dedicated browser or plugin is configured to communicate the mode selection to application server 132 for processing web requests from the corresponding mode switchable computing device 126.

Alternatively, such a dedicated browser or plugin provides similar capabilities when used on a direct input computing device 122—provides indication of the direct input features of the direct input computing device 122 to the web servers or application servers 130/132; or when used on an indirect input computing device 124—provides indication of the indirect input features of the indirect input computing device 124 to the web servers or application servers 130/132. The web servers 130 may be generic servers configured to process user requests and to communicate with other servers (e.g., application servers 1322), which are configured to provide responsive content depending on the type of computing devices 122/124/126. Furthermore, web servers 130 and application servers 132 may be a part of a cloud and are example cloud devices in a provider environment 138, along with data stores 134/136 for content 134A/136B, session information 134B/136B, and user information 134C/136C.

In an example implementation of the example system architecture 120, the web servers 130 may recommend communication via the application servers 132 or may work with the application servers 132 to provide its content in an appropriate format for the type of computing device 122/124/126 requesting the corresponding webpages. For example, a website owner may seek to provide format-friendly webpages for any type of computing device 122/124/126. Accordingly, the website owner may operate to provide a format-specific web server among its regular web server 130 or may collaborate with a service provider, via the service provider's application server(s) 132. In such cases, the content typically available to the direct input computing devices 122 are stored with its interactive elements identifier in a data store 134A of the application server(s) 132. As a result, such a process may be predefined rather than dynamic. Session information for each indirect input computing device 124 or mode-switchable computing device 126 may be stored via data store for session information 134B of a corresponding application server(s) 134. User specific information is also available for storage and use determining user preferences for the indirect input computing devices, via the user information data store 134C.

In an alternate aspect that relies on dynamic processing, a webpage from a web server 130 is first provided to any requesting computing device 122/124/126. For computing device 204/206, after rendering in the corresponding browsers or web-enabled applications, the computing device 124/126 may send a notification to the application server 132 indicating that it is an indirect input computing device (for element 124) or is in the indirect input mode (for element 126). The application server(s) 132 may also receive a portion of the webpage rendered on the computing device 124/126. The application server(s) 132 performs the processing for determining interactive elements and provides selectable options for the webpage rendered on the computing device 124/126. The selectable options are selectable by an indirect input as previously noted and selection of one selectable option enables a web action of the corresponding interactive element. Such selectable options include selectable clues (or codes) or a menu of the selectable clues (or codes) for selection via the indirect input.

In the implementation involving the above dynamic processing, the application server or servers 132 receives a portion of content. Such a portion may be a displayed portion, a rendered portion, or a selected portion from either, the computing device 124/126 or the web servers 130. The application server(s) 132 determines a first interactive element in the portion of content. The first interactive element may include may include an element identifier. The element identifier may be a unique identifier (UID) for a web object or an assigned serial number, random numbers, names or codes, each assigned to a corresponding interactive element. The element identifier may be associated with the interactive element from the corresponding web server 130 or may be applied by the computing device 124/126 using the above-referenced dedicated browser or plug-in. The application server 132 is configured to identify and store interactive elements from various sources at various times—using, for e.g., web crawlers to source interactive elements from web servers 130. The application server 132, however, may need to access data from direct input computing devices to determine, with high level of certainty, that an interface element is an interactive element. Accordingly, web crawlers may be used and the application server 132 may occasionally compare features of interface elements to previously stored interactive elements to augment its accuracy and to ensure the timeliness of its information.

For high levels of certainty or accuracy that interface elements are interactive elements, the application server 132 determines that a threshold number of interactive actions are associated with a second interactive element in a data store. The threshold number of interactive actions indicates that the second interactive element is selectable to perform a web action in response to an interaction by a user. For example, in implementations of a dedicated browser or plug-in, a user of the computing device 124/126 agrees to provide feedback of user interactions to the application server 132. In an alternate implementation, the use of the application server 132 may be limited to users that have an account with the application server 132. In such an alternate implementation, the application server 132 is able to crowd-source the confirmation that an interface element is an interactive element. Specifically, when a threshold number of interactive actions from users of direct input computing devices 122 are associated with the interface element, then the interface element is confirmed as selectable to perform a web action in response to an interaction by a user (i.e., it is an interactive element). Such confirmed interactive elements are stored as the second interactive element for comparison against the first interactive element received from either, the computing device 124/126 or web servers 130.

In the above example aspect, the application server 132 is configured to determine that the first interactive element is similar to the second interactive element by a similarity measure. In an example, the similarity measure is by identifying a number of similar features between the first interactive element and the second interactive element. Such similarity features are discussed with respect to FIG. 6—including tag names, individual attributes, style properties/specifications, ancestor counts and child counts. When the number of similar features exceeds a threshold number of similar features, then a determination is made that the first interactive element is associated with the second interactive element. In an example, the features may also include one or more of an input, a displayed media, a size specification, and the web action. When a number of the features are unique between the first interactive element and the second interactive element, the two interactive elements are considered the same, similar, or related in an interactive manner.

The application server 132 of the above example provides, to a computer requesting the webpage, a selectable option associated with the element identifier of the first interactive element. As the element identifier may be provided from the computer, the selectable option may be generated by converting the element identifier to a hyperlinked element identifier with a link to enable the web action associated with the first interactive element. As a result, when the selectable option is provided to the indirect input computing device, a selection of the selectable option by an indirect input to the computer enables the web action associated with the first interactive element. In an alternate implementation of the selectable option, the associated first interactive element, as provided in the form of a Document Object Model (DOM), is modified to include a visual feedback that allows a user to select the modified first interactive element by an indirect input. The DOM is typically generated from parsing a markup language document, such as a Hypertext Markup Language (HTML). In yet another aspect of the selectable option, the DOM is modified to provide the first interactive element in a clickable area of the displayed webpage. Alternatively the entire webpage is changed to display content in a manner that is format-friendly to the indirect input device 124 or indirect input mode in the mode-switchable computing device 126. For example, the DOM of the webpage may be modified to display all the interactive elements in a column and the corresponding text or non-interactive elements are displayed in a different column.

Figure 2A:
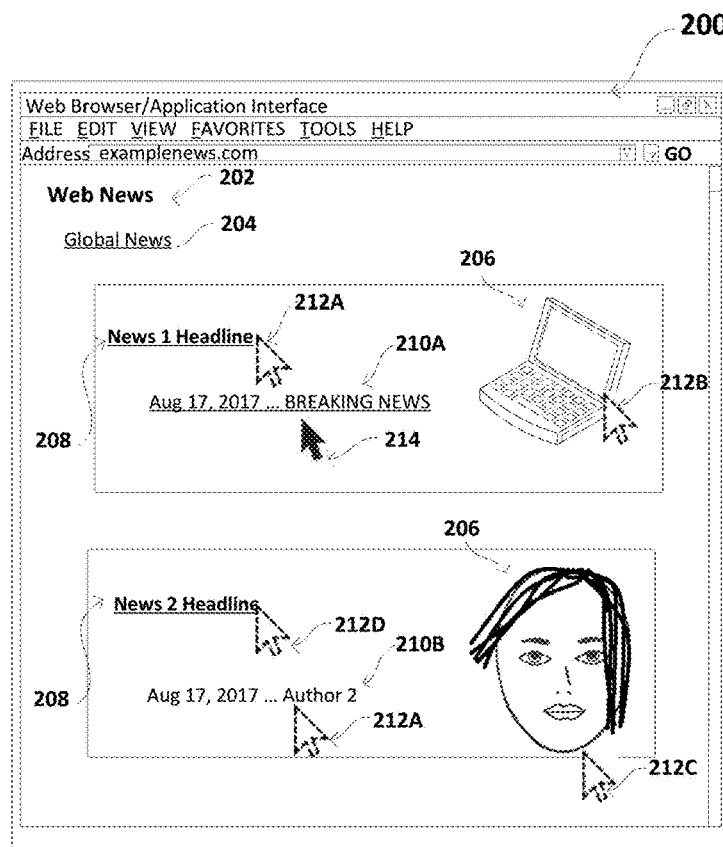
FIGS. 2A-2B illustrate example interfaces for direct input computing devices with cursor interaction, in an aspect of the present disclosure.
Figure 2B:
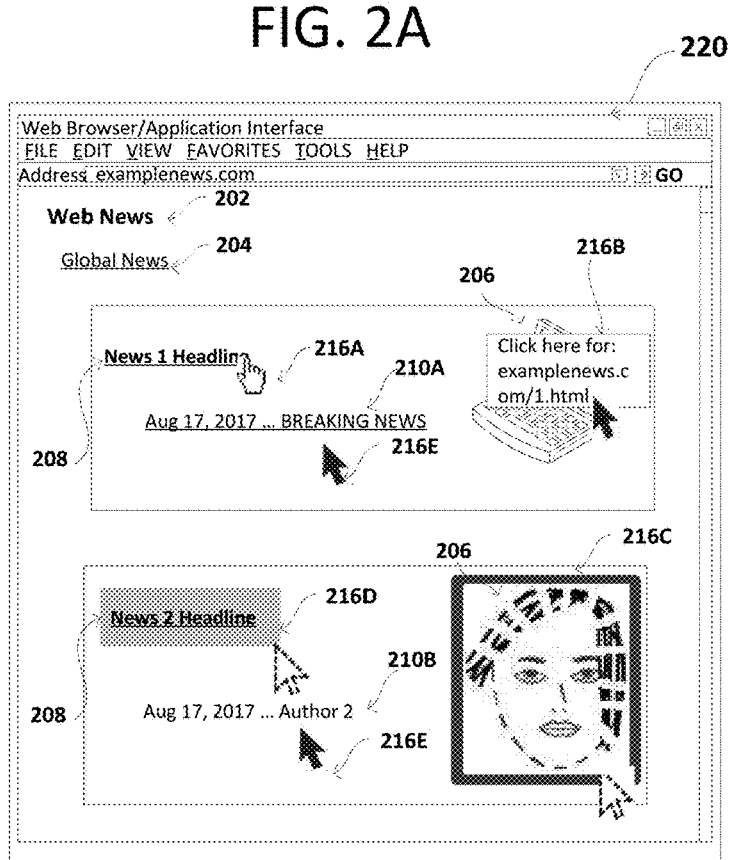

FIGS. 2A-2B illustrate example interfaces 200/220 for direct input computing devices with cursor interaction, in an aspect of the present disclosure. The example interface 220 may be displayed on movement of cursor 214 from its location in example interface 200 to a new location projected by a dotted outline pointer 212A/212B/212C/212D. For purposes of explanation, the dotted outline pointer 212A/212B/212C/212D are shown in example interface 200 at multiple locations to support that the cursor 214 may be moved to any of these locations, but only cursor 214 is displayed on the example interface 200 in real application. When the cursor 214 is moved to any of the positions indicated by dotted outline pointer 212A/212B/212C/212D, the example interface 220 may be displayed. In example interface 220, as in example interface 200, only one active cursor of the projected cursors 216A/216B/216C/216D/216E exists. The dotted cursors 216A/216B/216C/216D are indications of what may be show to a reviewer of the content when the cursor 214 were moved to these projected cursor locations.

The example interfaces 200/220 illustrate a web browser or application interface with news content (e.g., webpage) titled "Web News" 202 as example internet content within a web browser or application interface. There may be multiple interactive (e.g., clickable) or non-interactive interface elements 204, 206, 208, and 210A/210B. A user of a direct input computing device interfacing with example interface 200 may not know what the interactive or non-interactive interface elements are on example interface 200. For example, underlined titles "News 1 Headline" 208 may be assumed as interactive because it is underlined. Similarly, the "Breaking News" summary 210A may be assumed as interactive for the same reason as element 208, but the underlining in element 210A is merely as emphasis that there is breaking news for review. Accordingly, when the page is presented to a direct input computing device, a user may merely move cursor 214 over the interface elements 204, 206, 208, and 210A/210B to determine the interactive/non-interactive nature of these interface elements.

In the example interface 220, assuming that the cursor 214 is moved to the "News 1 Headline" then the cursor shape or style may change to reflect that the interface element 208 is an interactive element. The cursor shape is illustrated as changed from a pointer to a finger. In another example, if the cursor 214 is moved to the laptop image, then the cursor shape and style may remain, but a pop-up with the cursor 216B displays an indication that the interface element 206 is interactive—displaying "Click here for . . . " and providing a clickable link. In yet another example, if the cursor 214 is moved to another interface element 206 providing a photo of an associated person to the "News 2 Headline," then the cursor style may change, but also a highlighted box 216C may indicate that the photo is interactive. Alternatively, the photo may change stylistically or may play a preview of the news item relating to "News 2 Headline." In another alternate implementation, brightness, contrast, or other features of the photo may change or an overlay may be applied to indicate that the image is clickable. Another example is provided via the highlight 216D to interface element 208 to indicate that it is interactive. As previously noted, the underline to the "Breaking News" summary (of interface element 210A) is merely for emphasis and is not an indication of an interface element, and so, moving cursor 214 to that area maintains the cursor without change 216E. This is similar to if the cursor 214 were moved to non-clickable interface element 210B. Here too, the cursor is maintained without change 216E. Such determinations may not be possible using an indirect input computing device without the ability to interact with cursor indications as in FIGS. 2A and 2B.

Figure 2C:
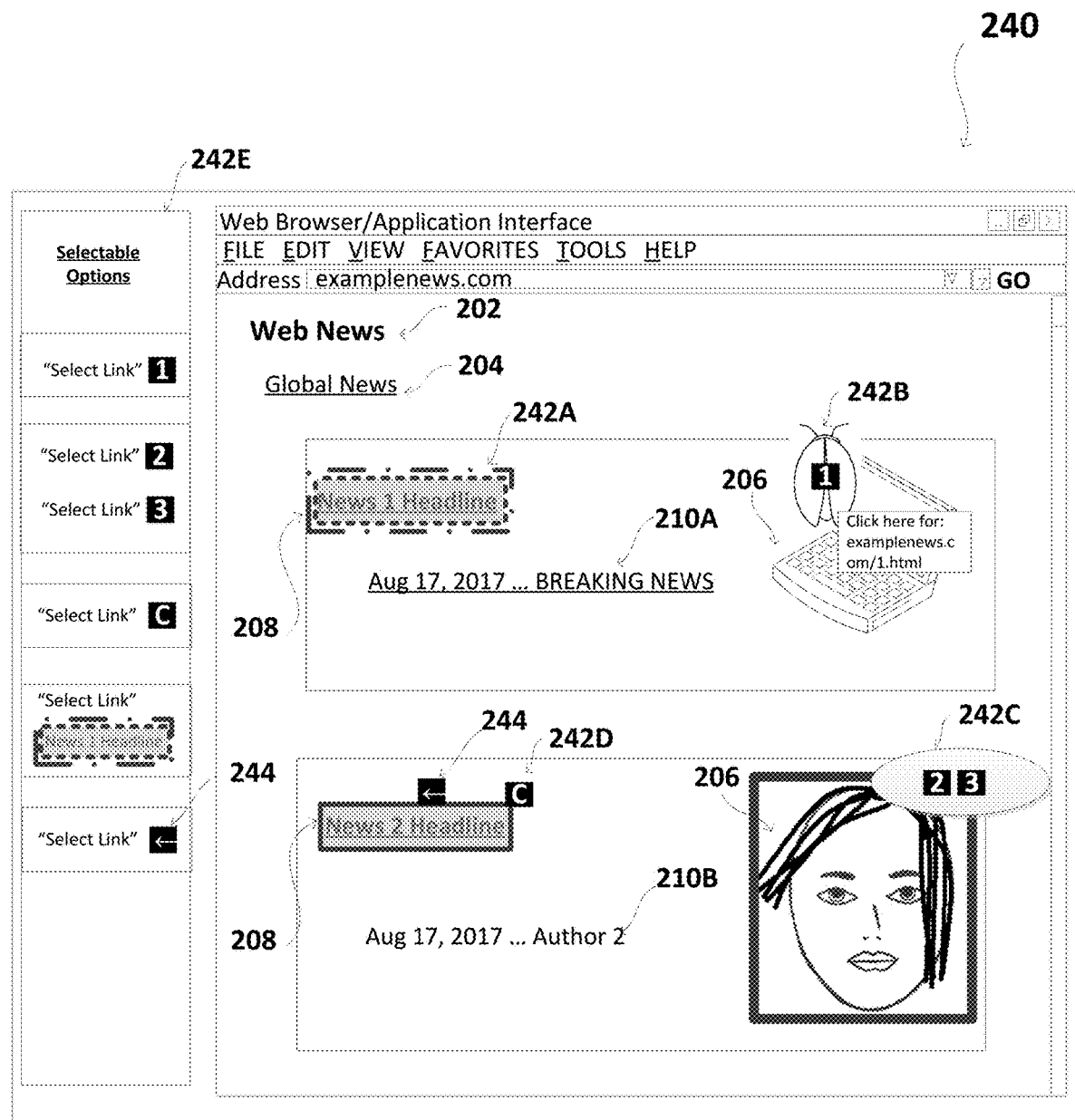
FIG. 2C illustrates an example interface for indirect input computing devices without cursor interaction, in an aspect of the present disclosure.

FIG. 2C illustrates an example interface 240 for indirect input computing devices where traditional cursor interaction is absent. In accordance with the present embodiments, selectable options are presented once all or portions of content 204, 206, 208, and 210A/210B are evaluated by an application server as discussed in reference to FIG. 1B. Pertinently, the application server, after performing the analysis explained throughout this disclosure to determine the interactive and non-interactive elements, provides selectable options for the interactive elements with the content for a user of the indirect input computing device. Such selectable options include highlights/blinking/clue options 242A, numeric options 242B/242C, or alphabetical options 242D. Alternatively, a menu of options 242E provides a shorthand summary of all the interactive elements on the displayed section of the content. When a menu of options 242E is presented, the example interface 240 may represent a modified interface (e.g., modified content or modified webpage) of the original example interface 200 (e.g., original content or original webpage). Further, in any of the example displays of selectable content, the selectable content may be updated dynamically, as the page is scrolled (e.g., the menu of options 242E scrolls with the page or changes as the page content changes) or some of the selectable options 242A/242B/242C/242D/242E disappear and new selectable options appear for the content within the displayed area of the web browser or application interface 240.

A user of the indirect input computing device may select from the interactive elements using the selectable options. The selectable options may also be recited to the user by such an indirect input computing device. For example, the user may provide a voice command "select link" "1"/"2"/"3"/"C" to cause an action underlying the corresponding interactive element to be performed. In a specific example, a voice command of "select link 1" causes the link underlying the interface element 206 (of the laptop image) to be activated and to open a window displaying content related to the link "examplenews.com/1.html." Alternatively, the user may have to provide coded commands—e.g., "select firefly" (corresponding to selectable option "1"). The user may, in other implementations, rely on a coded instruction, such as "Alexa select link C."

In another aspect, a user may select titles of interface elements 208 as displayed—e.g., "select link News 1 Headline," which causes the link selection for the "News 1 Headline" to activate and the full news content of this section to be displayed. In a further aspect, when an interactive element includes two actions, two selectable options are displayed with a relationship. Examples of a relationship include proximity of the two selectable options as within a distance from each other—e.g., 242C/242E or within a shaped bubble 242C. Examples of two selectable options include hovering action over the image 206 (of a person), which causes a preview of an underlying video to play; or clicking action over the image 206 (of a person), which causes the content underlying the "News 2 Headline" section to display in the same or a different window. The user may provide a voice command for "select link 2" or "select link 3" to access these interactive elements. Alternatively, a gesture action, an air action, a retina input, or a direction input (on a hand held remote) may indicate selection of a specific link. In implementations where the indirect input is a gesture or air action, the selectable options may include the gesture. For example, selectable option 244 over interface element 208 is a left arrow indicating a move left hand-gesture over the appropriate area of interface element 208 would cause activation of the link underlying interface element 208.

Figure 3:
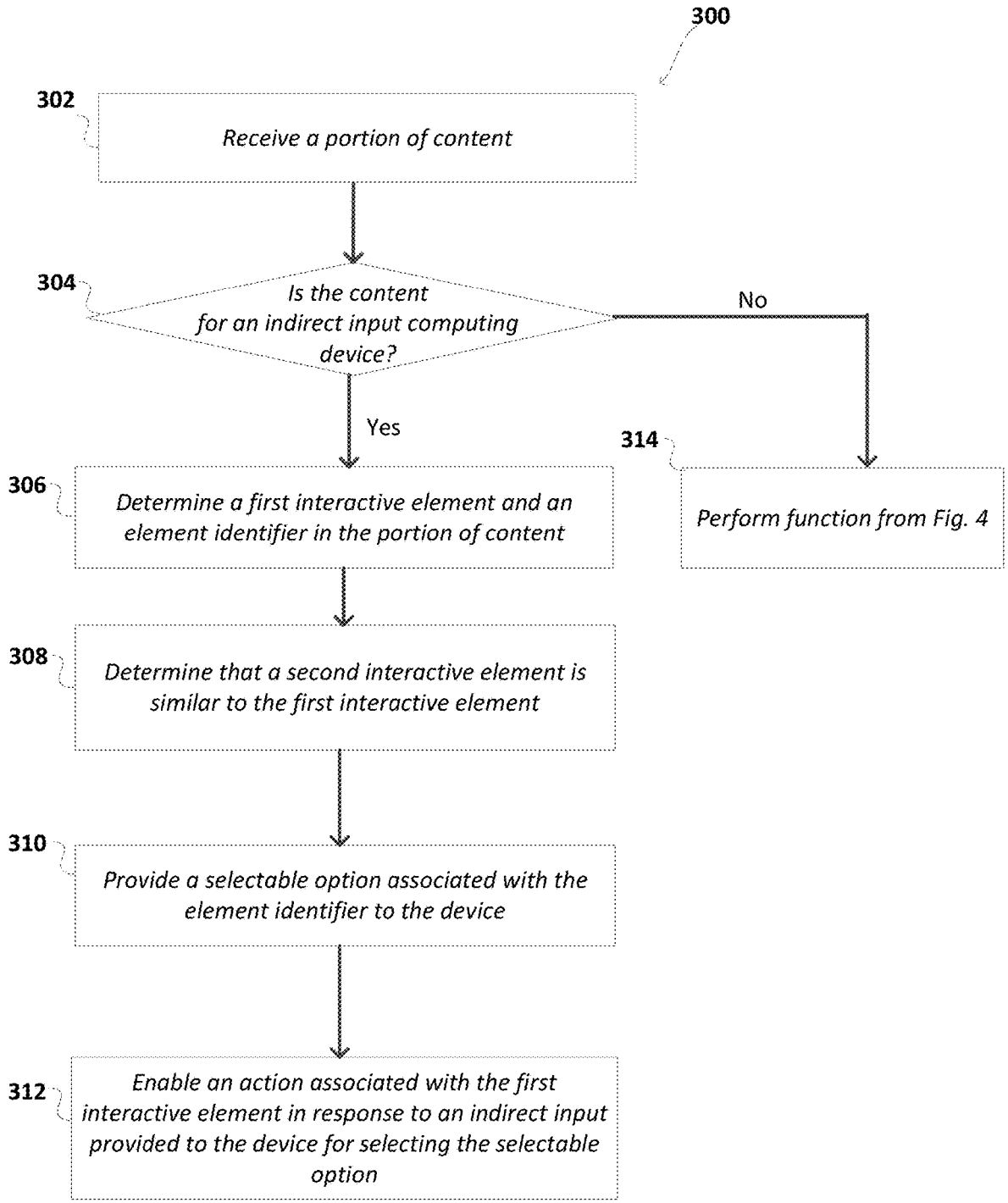
FIG. 3 is a flow diagram of an example process for processing interactive content for user interaction in indirect input computing devices, in accordance with various embodiments.

FIG. 3 is a flow diagram of an example process 300 for processing interactive webpage content for user interaction in indirect input computing devices, in accordance with various embodiments. The example process 300 may be performed on the application server 212 or on any one of web servers 210, depending on a type of implementation—by a dedicated service provider or by website owners. In either implementation, the example process 300 includes a sub-process 302 for receiving a portion of a webpage. The portion of the webpage may be received from a web server 210 or from one of computing devices 202/204/206. Sub-process 304 is a decision block to determine if the webpage is for an indirect input computing device. In an example of such a determination, the portion of the webpage from the device may include an identifier for the device, a browser or plugin operating on the device, or a session on-going with the web server 210 or the application server 212. Sub-process 304 may then rely on this identifier to determine if the webpage is for an indirect input computing device.

Figure 4:
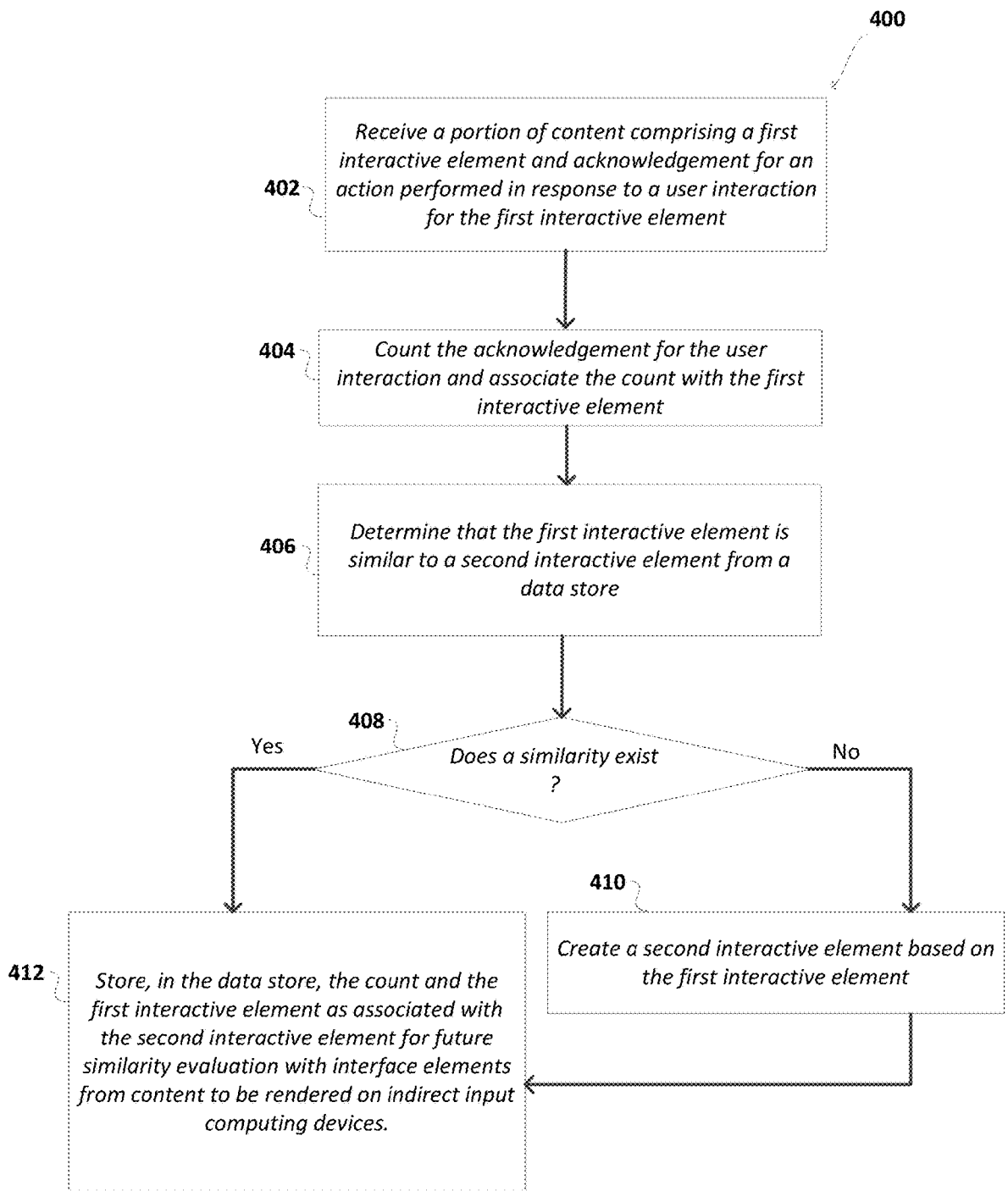
FIG. 4 is a flow diagram of an example process for processing interactive content in relationship with direct input computing devices, in accordance with various embodiments.

When the sub-process 304 determines that the webpage is not for an indirect input computing device, then sub-process 314 may be performed via the disclosure with respect to FIG. 4. When the sub-process 304 determines that the webpage is for an indirect input computing device, then a determination is made, via sub-process 306, that the portion of the webpage includes a first interactive element and an element identifier. Sub-process 308 determines that a second interactive element is similar to the first interactive element. A data store, as illustrated at element 214 in FIG. 2, provides second interactive elements from which such a determination is made. For example, in sub-process 302, the portion the portions of the webpage may be portions of a Document Object Model (DOM), where an individual portion of the portions of the DOM includes the first interactive element and the element identifier—as determined in sub-process 304. Then in sub-process 306, a determination is made that the first interactive element is associated with the second interactive element when a similarity score for the first interactive element and the second interactive element is greater than a threshold score.

In sub-process 310, a selectable option that is associated with the element identifier is provided to a computer, such as the above-referenced indirect input computing device for which the webpage is intended. Sub-process 312 enables a web action associated with the first interactive element in response to an indirect input provided to the computer for selecting the selectable option. In an aspect of the example process 300, the indirect input is initially available request for a webpage and the application server 212 or web server 210 receives the request for the webpage from an indirect input to the computer. In an alternate implementation, following the sub-processes 302 to 308, sub-process 310 provides a modified webpage to the computer with at least the selectable option. The selectable option is linked to the first interactive element. In the example process 300, the application server 212 or web server 210 enables the selectable option to receive a user interaction and displays the web action or a result of the web action. In a further alternative aspect of process 300, the application server 212 or web server 210 determines a descriptor for the second interactive element and provides the descriptor as the selectable option to the computer.

FIG. 4 is a flow diagram of an example process 400 for processing interactive webpage content in relationship with direct input computing devices, in accordance with various embodiments. The sub-processes of FIG. 4 may occur when the portion of the webpage of sub-process 302 in FIG. 2 is determined as for a direct input computing device. Specifically, the example process 400 provides a method for determining which interface elements are interactive elements. Sub-process 402 receives a portion of the webpage that includes a first interactive element and an acknowledgement for a web action performed in response to a user interaction for the first interactive element. In an example, using a dedicated browser, plug-in, agent, or session specific with an application server or web server, a direct input computing device provides the application server or web server with a user tracking ability. When the direct input computing device indicates that the first interactive element is acknowledged as performing a web action upon user interaction, a count of such acknowledgements is made via sub-process 404.

Sub-process 406 provides a determination that the first interactive element is similar to a second interactive element from a data store. Decision sub-process 408 provides alternatives to the determination from sub-process 406. For example, when the first interactive element is a new interactive element that is encountered for the first time by the application server or web server, the sub-process 410 is implemented to create a second interactive element that is based on the first interactive element. When there is a similarity determined between the first interactive element and a second interactive element from the data store, then sub-process 412 stores the count and first interactive element as associated with the second interactive element for future similarity evaluation. In an alternate implementation, the count is updated every time an acknowledgement is received with a first interactive element that is similar to a second interactive element. The example process 400 is, therefore, repeated for every portion of the webpage received in the application server or web server.

In an example aspect, process 400 configures a computer to determine an individual second interactive element of second interactive elements in the data store that have at least a threshold number of interactive actions from direct input computing devices. The threshold number of interactive actions indicates that the individual second interactive element is selectable to perform an associated web action in response to an interaction by a user. Such a process, for example, relies on the application server crawling and retrieving interface elements from content (e.g., websites) for analysis with the stored second interactive elements. As a result of such a process, the individual second interactive element is stored for determining similarity with the first interactive element with respect to requests from indirect input computing devices.

Figure 5:
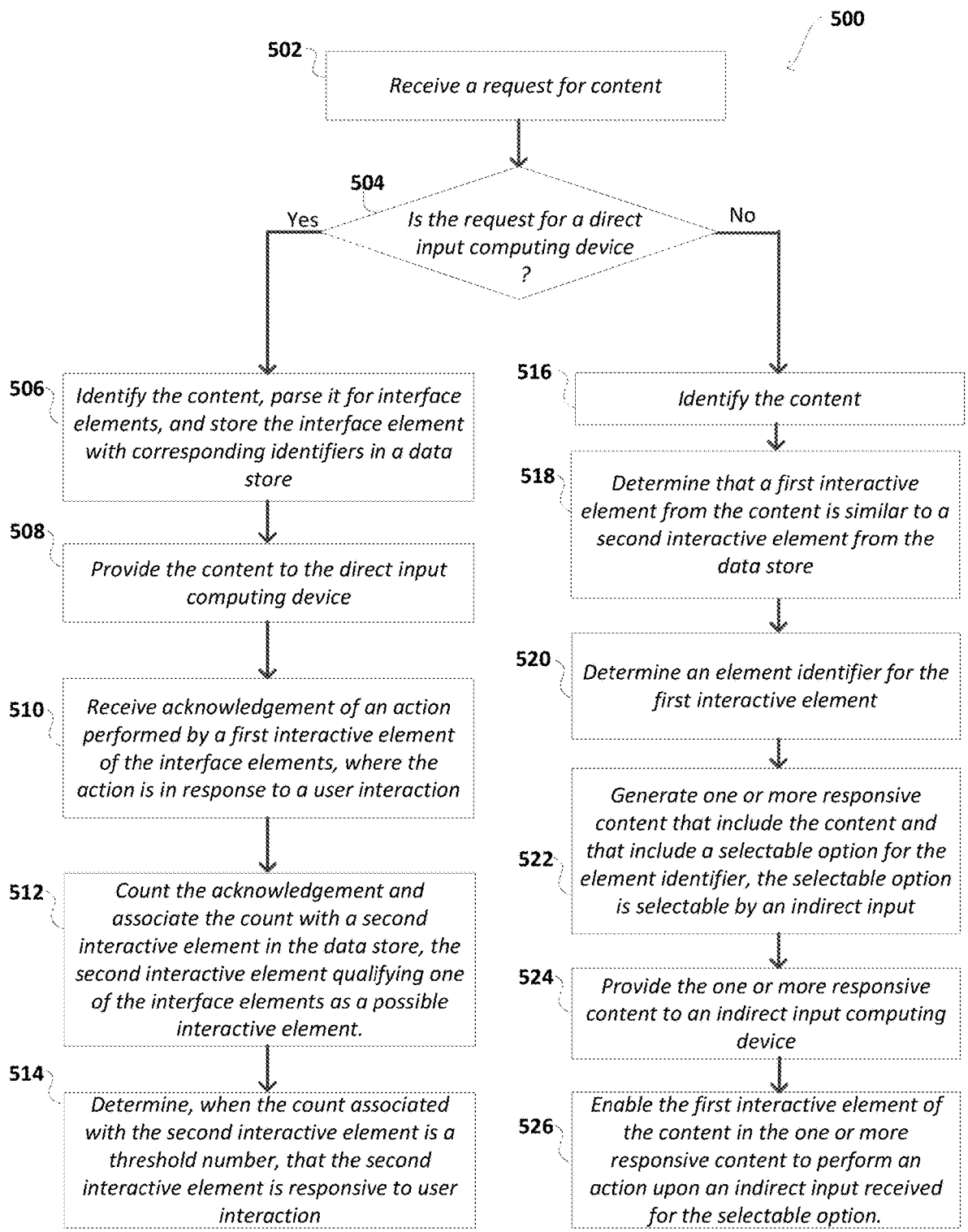
FIG. 5 is a flow diagram of an example process for processing content for any computing device, in accordance with various embodiments.

FIG. 5 is a flow diagram of an example process 500 for processing content for any computing device, in accordance with various embodiments. While example process 300/400 are implemented based on a received portion of content, either dynamically or in a predetermined processing manner, the example process 500 works based on requests for content. Such requests are dynamic requests and the process 500 is performed during the processing for the request. Sub-process 502 receives a request for content (such as a webpage). Such a request may be received in an application server or web server as illustrated and supported in FIG. 2. In sub-process 504 a determination is made for whether the request is for a direct input computing device. For example, the request could include an identifier of the requesting device, browser or plugin information of the requesting device, or a session identifier of the requesting device. In an alternate implementation, the request is received via a third party server (e.g., proxy server or virtual private network). In instances where the request is received via a third party server, there may be an associated identifier for indicating that the requests are for either the indirect input or direct input modes.

When the determination is that the request is for a direct input device an application or the web server receiving the request may function to augment its data store of confirmed interactive elements. Specifically, in sub-process 506, the webpage is identified and parsed for its interface elements. The identification of the webpage may be by its uniform resource identifier or locator (URI/URL), which may provide information of the domain, the website, the sitemap, the security credentials, and other related information. This identification allows the application server or web server to determine to store interface elements identifier as interactive elements in the webpage in a consistent manner for future reference. Initially, the interface elements and corresponding identifiers are stored in a data store of the application server or the web server via sub-process 506.

Sub-process 508 provides the webpage to the direct input computing device in response to the request made in sub-process 502. The webpage may be provided with user tracking script. In an implementation, the use tracking script modifies the webpage so that when a user of the direct input computing device interacts with the modified webpage, then acknowledgements of web actions performed by interface elements of the modified webpage are provided back to the application server or web server. In an alternate implementation that relies on a dedicated browser, an agent, a plugin (for any generic browser), or a session identifier, these components provide the user tracking information for the webpage and the webpage is not modified. Instead, the dedicated browser, plugin, or a session identifier is permitted to provide user tracking information back to the application server or the web server.

In sub-process 510, the acknowledgements of web actions performed by a first interactive element of the interface elements on the webpage are received by the application server or web server. The web actions indicate that user interactions have occurred to the first interactive element. Sub-process 512 provides a count of the acknowledgements and associates the count with a second interactive element in the data store. When the first interactive element is new, then a second interactive element is created in the data store as a copy of the first interactive element. The second interactive element, accordingly, qualifies one of the interface elements as a possible interactive element. Subsequently, through repeated processing of requests from users for webpages that include the same second interactive element, sub-process 514 provides a determination that, when the count associated with the second interactive element is a threshold number, then the second interactive element is responsive to user interaction. As a result of this confirmation, a first interactive element received for an indirect input computing device, when compared for similarity with the stored second interactive elements in the data store, is likely to identify the second interactive element as a match. This identification allows the application server or web server to provide a selectable option with the webpage to the indirect input computing device such that a selection of the selectable option by an indirect input enables the first interactive element to perform its corresponding web action. This is demonstrated via sub-processes 516-526 of FIG. 5.

When the request in sub-process 502 is determined as for an indirect input computing device or a mode-switchable computing device in the indirect input mode, then sub-processes 516-526 are performed. Sub-process 516 identifies the webpage. Sub-process 518 determines that a first interactive element from the webpage is similar to a second interactive element from the data store. This is similar to sub-process 308 of process 300. Sub-process 520 determines an element identifier for the first interactive element. Such element identifier may be provided with the first interactive element. Sub-process 522 generates one or more responsive webpages that include the webpage and that includes a selectable option for the element identifier. For example, sub-process 522 generates an add-on webpage (e.g., pop-up or side menu) that is associated with the webpage. The add-on webpage may include the selectable option as a link to the first interactive element of the webpage. Alternatively, the webpage is provided in a modified format with the first interactive element visually highlighted and identified for selection by an indirect input in the format suitable to the indirect input computing device. As previously noted, if the indirect input is a voice command, then the selectable option is a highlight in red color and the voice command is "select red element."

Sub-process 524 provides the one or more responsive webpages to the indirect input computing device for review and browsing. Sub-process 526 enables the first interactive element of the webpage in the one or more responsive webpages to perform a web action upon the indirect input received for the selectable option. The sub-process 516-526 may be repeated for every request in a dynamic manner or may be pre-processed for the hierarchy of pages within the same domain or under the same sitemap (as identified based on the webpage, via sub-process 516). Accordingly, there may be no latency as the user makes selections in one webpage, the related new webpage may be displayed with the interactive elements identified for indirect input.

Figure 6:
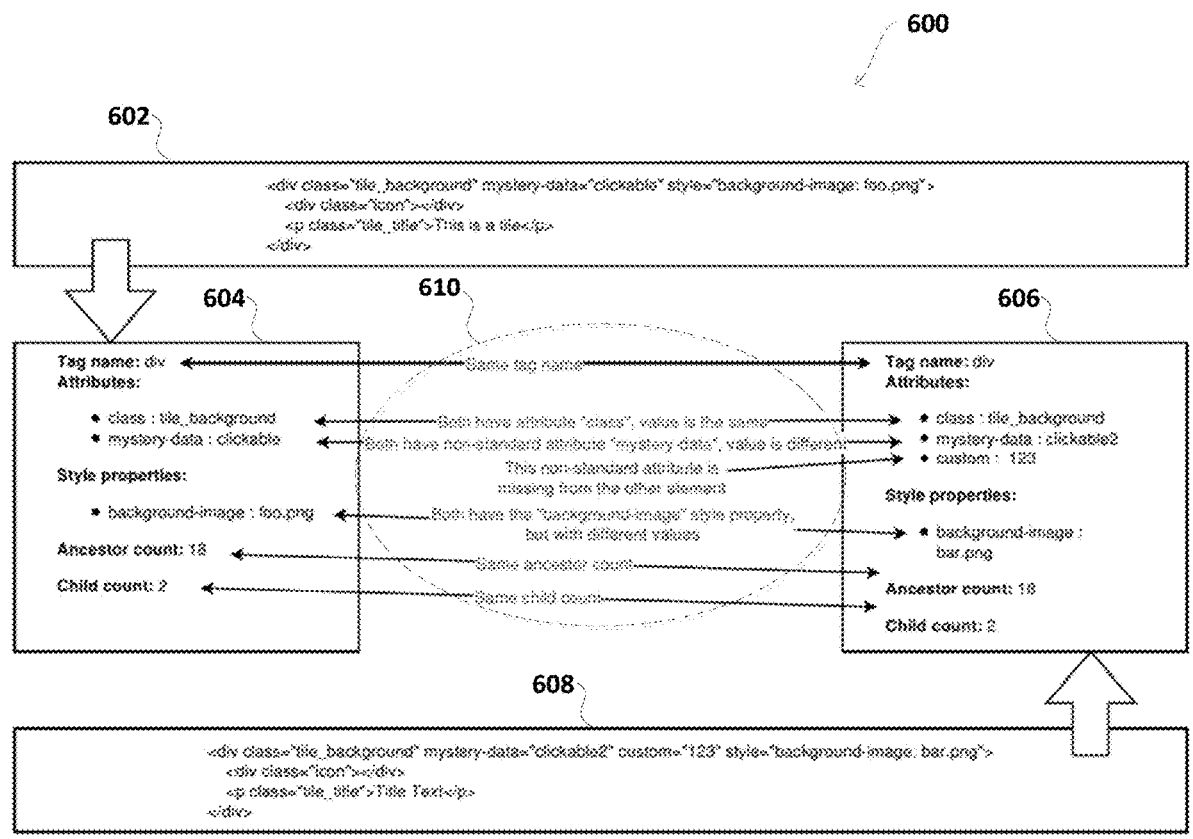
FIG. 6 is a block diagram illustrating example interface elements with features that are subject to similarity measurements for determining interactive elements, in accordance with various embodiments.

FIG. 6 is a block diagram 600 illustrating example interface elements 602/604/606/608 that may be subject to the example process of this disclosure for determining interactive elements using a similarity measure. Interface elements may be in the form of markup language elements 602/608 or its counterpart DOMs 604/606, which can be obtained from parsing the markup language elements 602/608. Alternatively, scripts for stand-alone applications are contemplated in an embodiment herein, where the scripts execute on a processor to provide content on a standalone application. Indirect input computing devices may rely on the processes disclosed herein to determine clickable elements of user interface portions of the standalone application by a process that counts confirmed clickable elements from direct input computing devices. In an example of such an implementation, Application Programming Interfaces (APIs) with scripts or routines may be provided as user interface aspects of the stand-alone application for the direct input computing device, and may be provided to determine the clickable features for an application server that communicates selectable options from the clickable features for indirect input computing devices. The markup language elements 602/608 are rendered in a browser or application interface to provide the interface elements to a webpage. For this disclosure, the interface elements are in the form of the rendered elements on a webpage or graphical user interface, scripts, the markup language elements 602/608 or the DOMs 604/606. Accordingly, the markup language elements, scripts, or DOMs are used interchangeably herein, including with interchangeable reference to numerical identifiers in the FIGS., to reference interface elements subject to the presently disclosed processes. The DOMs include features, such as those referenced in the similarity comparison element 610, that are used to measure similarity against stored interactive elements. Examples of the features used in the similarity measurement include tag name, attribute classes (and attribute values), background-image system and values, and ancestor and child counts. In an example, ancestors are parental DOM elements (e.g., parent classes) in an upward review of nested elements of a DOM tree. The child refers to child DOM elements in a downward review of nested elements of the DOM tree. Further, the background image and associated portable network graphics (PNG) files provide the actual graphic displayed when the DOM 602/608 is rendered on the browser or the application interface. Similar referenced graphics may provide a high level of certainty that that two interface elements are related.

In the example of FIG. 6, a portion of content, including interface element 608 or DOM 606, may be evaluated against known interactive elements 602/604 (stored from a direct input computing device). When one or more of the features 610 (e.g., tag name, attributes, background images, style properties, ancestor counts, child counts, or corresponding values for each of these) are determined similar to features of stored interactive elements (including comparison of the webpage URI that host the interface element and the stored interactive elements), then a measure of the number of similar features and the level of similarity may be determined. For example, in FIG. 6, both elements 604 and 606 have same tag name, same ancestor count, and same child count. Accordingly, 3 of 6 features are common. Additionally, some features maybe designated as having more weight (e.g., background images or style properties), which may dynamically change as the known interactive elements are positively identified in more number of interactions from the direct input computing devices.

In an example, when more than 50% similarity of features is achieved and at least certain specific features are similar (e.g., background image or displayed image—which provides more weight to the similarity measure), then a received interface element is deemed interactive. A selectable option is provided in response to receiving the portion of the content such that the selectable option provides a visual identifier and a link to activate the underlying action of the interface element. In an aspect, the certain specific features may be a reliance on non-standard features (e.g., the "custom" attribute in the similarity identification list 610) provide more weight to the measure of similarity between a received interface element and stored interactive elements. In the example of FIG. 6, even though the DOMs 604/606 are merely example interface elements, if one was being compared to the other for similarity measurement purposes, there may be a match as certain features are common. However, if the threshold number for similarity measure is set at higher value than three similar features, then there would be no match for the similarity measurement. Moreover, the similarity is not merely to the absence or presence of certain attributes, but also based on the comparison of the attribute values—e.g., comparison of style and size values for the elements.

Furthermore, the DOMs 602/608 may include Dynamic Hypertext Markup Language (DHTML), JavaScript®, ActionScript®, or Flash®. Such script, in addition to the above-identified features, may also provide features for an input (hover, click, etc.), a size specification, and the web action. In an implementation relying on the scripts for a similarity determination, a process may parse the DOM 602/608 associated with the portion of the webpage to determine features of the first interactive element and to determine the element identifier. The process includes evaluating the features against stored features associated with second interactive elements in the data store. When similar stored features are identified to the features of the first interactive element, then a process in an application server or web-server provides the element identifier within an interactive script to enable the script to receive an indirect input.

Figure 7:
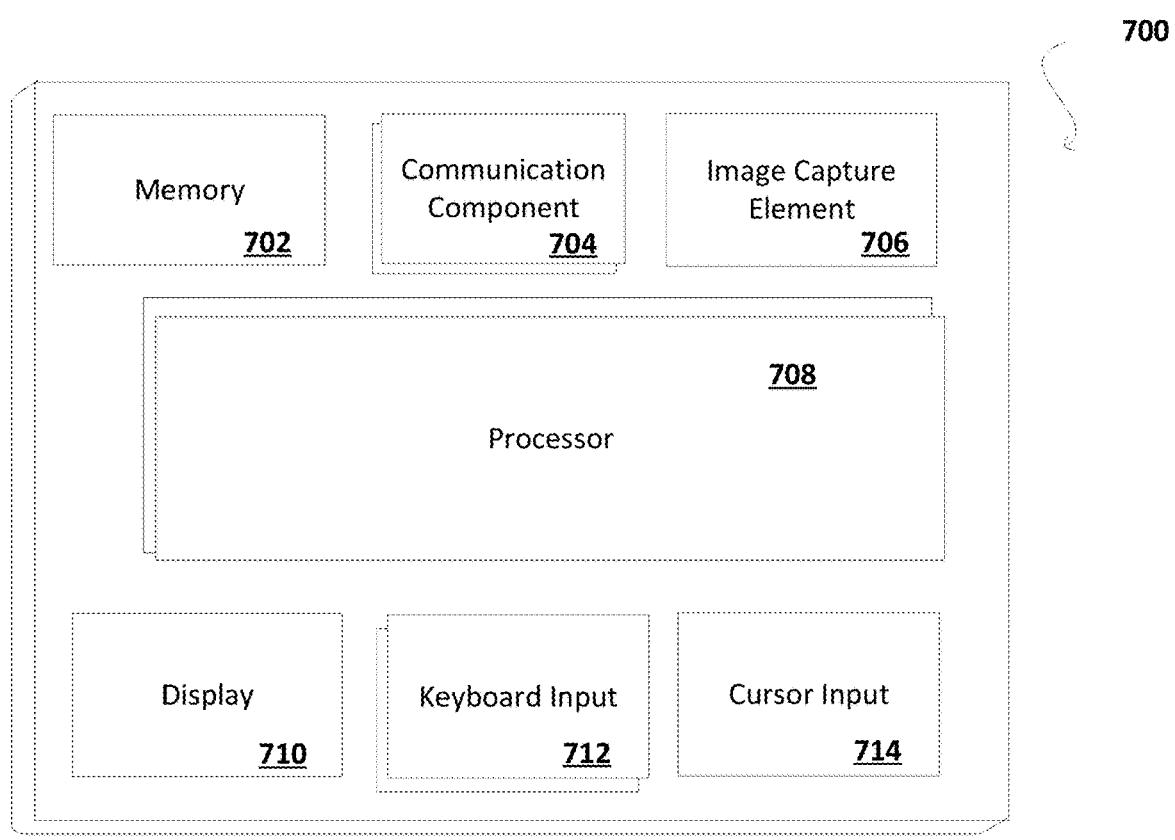
FIG. 7 illustrates an example direct input computing device for performing one or more of the disclosed embodiments.

FIG. 7 illustrates an example configuration of components 702-714 of an example computing device 700, such as any of the direct input computing devices 102/202 illustrated in FIGS. 1 and 2. Components 702-714 are a set of basic components, but alternative or different arrangements are applicable for any of the disclosed computing devices in this disclosure, without changing the features in the embodiments above. In the example of FIG. 7, the computing device 700 includes at least one processor 708 for executing instructions that can be stored in a memory device or element 702. As would be apparent to one of ordinary skill in the art, upon reading this disclosure, that the computing device 700 can include many types of memory, data storage or computer-readable media, such as a data storage for program instructions for execution by the processor 708.

The same or separate storage than memory 702 can be used for data and a removable memory can be available for sharing information with other devices. Further, any number of communication approaches can be available for sharing the information with other devices. Furthermore, it would also be apparent to one of ordinary skill, upon reading this disclosure, that processor 708 may be multiple processors, each with processing tasks for the embodiments here, and may collectively act as a processor for the embodiments herein.

The example computing device 700 includes at least one type of screen or display element 710, such as a touch screen, electronic ink (e-ink), organic light emitting diode (OLED) or liquid crystal display (LCD), although devices such as portable media players might convey information via other means, such as through audio speakers. The example computing device 700, in an example, may also include at least image capture element 706. The image capture element 706 can include any appropriate technology, such as a CCD or CMOS image capture element, to capture an image.

The example computing device 700 additionally includes input elements 712/714 that are available to receive conventional input from a user. This conventional input can include, for example, touchpad, touchscreen, keyboard, mouse, trackball, keypad or any other such direct input device or element whereby a user can input commands to move a displayed cursor on the display element 712. The input elements 712/714, in an example, are connected to the computing device 700 by a wireless IR or Bluetooth® or other link. Furthermore, the computing device 700 includes, in another example, communication component 704 representing various communication features for the computing device to commute with near and far devices. For example, using Bluetooth®, Wi-Fi®, and other communication protocols.

Figure 8:
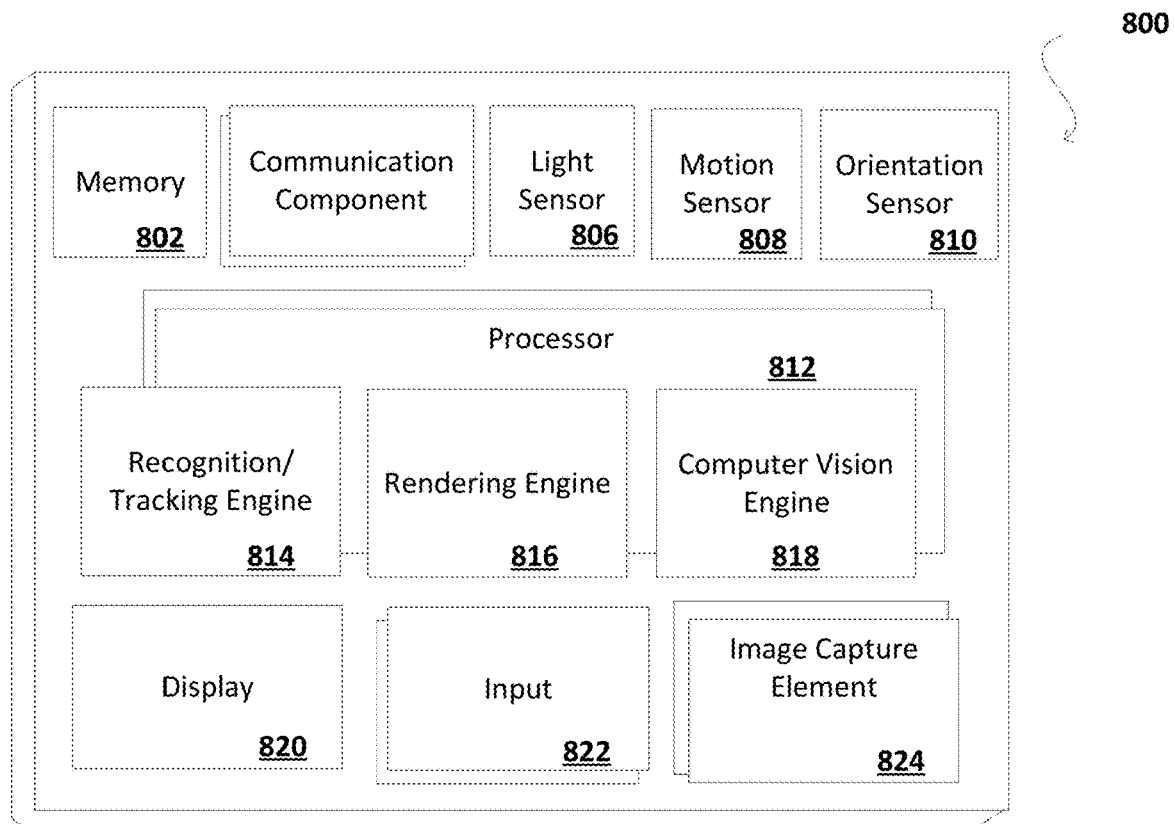
FIG. 8 illustrates an example indirect input computing device for performing one or more of the disclosed embodiments.

FIG. 8 illustrates an example configuration of components 802-824 of an example computing device 800, such as the indirect input computing devices 104/204 and the mode-switchable computing devices 206 illustrated in FIGS. 1 and 2. Components 802-824 are a set of basic components for a computing device, but alternative or different arrangements are applicable for any of the disclosed indirect input computing devices and mode-switchable computing devices in this disclosure, without changing the features in the embodiments above. In the example of FIG. 8, the computing device 800 includes at least one processor 812 for executing instructions that can be stored in a memory device or element 802. As would be apparent to one of ordinary skill in the art, upon reading this disclosure, that the computing device 800 can include many types of memory, data storage or computer-readable media, such as a data storage for program instructions for execution by the processor 812. The same or separate storage can be used for images or data, and a removable memory can be available for sharing information with other devices. Further, any number of communication approaches can be available for sharing the information with other devices. Furthermore, it would also be apparent to one of ordinary skill, upon reading this disclosure, that processor 812 may be multiple processors, each with processing tasks for the embodiments here, and may collectively act as a processor for the embodiments herein.

The computing device 800 includes at least one type of screen or display element 820, such as a touch screen, electronic ink (e-ink), organic light emitting diode (OLED) or liquid crystal display (LCD), although devices such as portable media players might convey information via other means, such as through audio speakers. In addition to the above, the computing device 800 includes at least a semiconductor component for a computer vision engine 818, such as a chip. Component 818 is useful to process indirect input from devices such as augmented reality (AR) devices, virtual reality (VR) devices and optical input devices. The computing device 800, in an example, also includes an image capture element 824. As previously noted with respect to FIG. 7, the image capture element 824 of FIG. 8 can similarly include any appropriate technology, such as a CCD or CMOS image capture element, to capture an image or hand gestures or retina movements. Methods for capturing gestures and movements using an image capture element with a computing device are known in the art, upon reading this disclosure. Further, it is generally understood, from this disclosure, that image capture can be performed using a single image, multiple images, periodic imaging, continuous image capturing, image streaming, video, live camera view, etc. As discussed, IR imaging can also be used to locate and track features of a user for gestures and air actions.

The example computing device 800, may have at least two sensors or image capture elements (e.g., two reference numeral 824) with each capable of capturing image data with 3 dimensional (3D) depth information. This may provide additional gesture identification with filtering ability for surrounding movements. Additionally position information also provided via the sensors 824 is used to determine the 3D position of arm movements in a physical environment for the computing device 800. Such a process uses a distance, as well as a relative projection direction for making such a determination of the relative position of the arm movements. Such an approach enables an accurate capture of gesture information and air actions.

Further, sensors 806 or 824 may be used to calibrate the input components of the computing device 800 with respect to the gesture and air action inputs. The computing device 800 additionally includes at least one orientation sensor 810, such as an accelerometer, digital compass, electronic gyroscope or inertial sensor, which can assist in determining movement or other changes in orientation of the device. The device can include at least one additional input device 822 that is available to receive conventional input from a user. This conventional input, along with the orientation sensor 810 and camera/light sensors 806/824, can include, for example, radio-communications type wand devices, hand or gesture devices, push buttons, touchpads, touchscreens, wheel devices, joysticks, keyboards, mouse, trackballs, keypads, or any other such device or element whereby a user can input a command to the device. As the example computing device 800 is configured for indirect input computing devices and mode-switchable computing devices, the ability to switch between direct and indirect input requires the above-referenced convention and non-conventional input sensors.

The conventional input, in one example, interfaces with a user interface (e.g., webpage) to move pointers or indicators (as cursors) on the UI. Moreover, the additional input device 822 (or any of the orientation sensors or camera/light sensors), in an example, is connected to the computing device 800 by a wireless IR or Bluetooth® or other link. In an embodiment, computing device 800 might not include any buttons at all and might be controlled only through a combination of visual, gesture, air actions, retina input, or audio commands, such that a user can control the computing device without having to be in contact with the computing device.

Furthermore, the computing device 800 includes, in another example, communication component 804 representing various communication features for the computing device to commute with near and far devices. For example, using Bluetooth®, Wi-Fi®, and other communication protocols. The light/color sensor 806 and a motion sensor 808 are provided to enable the computing device to be used in various lighting environments and to enable the computing device UI to be controller by movement gestures as discussed with respect to FIGS. 1 and 2, for instance. A recognition and tracking engine 814 is provided to track user gestures/air actions/retina inputs, etc. when the indirect input is activated. A rendering engine 816 is provided to render image data for the gesture input/air input/and retina input, as discussed with respect to above embodiments.

In a further example implementation, motion sensor 806 is configured to provide motion input to the UI using a user's face (e.g., retina input) to determine various aspects useful for determining relative orientation. The front camera includes, in an example, the features for the motion sensor 806 to track a user's retina. Once the user's eye is tracked, an algorithm is processed to place a virtual box around an object of the representations of the objects in the screen view. The position and/or size of this box is continually updated and monitored in order to monitor relative user position. Similar algorithms can also be used to determine an approximate location and area of each of the user's eyes (or in some cases the eyes in tandem). In determining the location of the user's eyes, the processor 812 can determine the view position of the user's head, and can determine that the user is facing the device. Further, the relative movement of the user's eyes can be easier to detect than the overall movement of the user's head when performing motions such as nodding or shaking the head back and forth. Monitoring the virtual box size also helps to provide distance information as well as directional information, which can be helpful when generating a 3D version of the captured image, live camera view, or video. This is also used for the VR and AR implementations previously discussed.

Once the positions of facial features of a user are identified, relative motion between the user and the computing device 800 (or a remote device to computing device 800) can be detected and utilized as input. For example, the UI of the above embodiments interfaces with the computing device and the movement of the user's head in an up and down movement, with respect to the viewable area of the image capture element, e.g., front facing camera 824. As discussed, this could be the result of the user moving his or her head, side to side, or the user moving the device up and down (and further, side to side). Each of these movements are tracked, in an example, as a vertical or horizontal movement, respectively, and each can be treated differently as an input to provide a selection of the selectable option displayed for the available interactive elements of a webpage. As should be understood, such a process also can detect diagonal or other such movements. Further, the computing device, with the present disclosure, can also distinguish between different users using the eye information, at least.

As mentioned, various embodiments include tracking of one or more objects of interest in three-dimensional space. With the third dimension image data, i.e., depth, distance, or disparity, from at least a pair of 2D images, object tracking can be less sensitive to factors such as shadows, lighting changes, and camera dynamics. Depth, disparity, or distance information can also optimize object tracking. As the relative sizes of an object's features are known, the computational expense of searching over scales can be minimized and the probability of false detections may be reduced since the search space is decreased. Depth, distance, or disparity, in an example, is applied to obtain shape and size information that can help to differentiate among foreground objects for improved tracking. Further, the previously described occlusions is more easily detected and handled more explicitly when more 3D information is available. Depth, distance, or disparity also provides at least another disambiguating dimension that can help to improved tracking.

Methods for capturing images or video using a camera element with a computing device are well known in the art and will not be discussed herein in detail. It is readily apparent on reading the present disclosure that image capture can be performed using a single image, multiple images, periodic imaging, continuous image capturing, image streaming, etc. Further, a device can include the ability to start and/or stop image capture, such as when receiving a command from a user, application, or other device. Additionally, input 822 can include at least one audio capture component, such as a mono or stereo microphone or microphone array, operable to capture audio information from at least one primary direction. A microphone can be a uni- or omni-directional microphone as known for such devices. The audio capture component works with a speaker to communicate the selectable options and user selection of the selectable options between the computer 800 and the application server or web server.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. Each of these example systems are configured based on the detailed disclosure herein and are therefore specific, in application, to the processes of content display. In each of the above example computer, computing devices, or processor devices, the distinction of the direct or indirect input computing devices assist the type of webpage displayed to the user—with or without selectable options, at least.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art, upon reading this disclosure, for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C # or C++, or any scripting language, such as Perl®, Python®, or TCL, as well as combinations thereof. The server(s) may also include database servers, including without limitation those commercially available from Oracle®, Microsoft®, Sybase®, and IBM®.

The environment can include a variety of databases and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, the embodiments above teach customization of hardware that may be used with software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident upon reading the present disclosure that various modifications and changes may be made thereunto without departing from the broader spirit and scope of the invention as set forth in the claims.

What is claimed is:

1. A system, comprising:
   at least one processor; and
   memory storing instructions that, when executed by the at least one processor, cause the system to:
   receive a portion of a web page;
   determine a first interactive element in the portion of the web page;
   determine that a threshold number of interactive actions are associated with a second interactive element in a data store, the threshold number of interactive actions indicating that the second interactive element is selectable to perform a web action in response to an interaction by a user;
   determine that the first interactive element is similar to the second interactive element using a similarity measure that is based at least in part on at least one of the interactive actions being available in the first interactive element;
   associate a selectable option with the first interactive element; and
   provide, to a computer requesting the web page, the selectable option for invoking by an indirect input that references the selectable option to the computer to cause the at least one of the interactive actions to occur.

2. The system of claim 1, wherein the instructions, when executed by the at least one processor, further cause the system to:
   cause a visual indication displayed by the computer to indicate the first interactive element is available for the indirect input based on the selectable option; and
   enable a user interaction for the selectable option by the indirect input.

3. The system of claim 1, wherein the instructions, when executed by the at least one processor, further cause the system to:
   evaluate the first interactive element against other interactive elements from the data store, the other interactive elements including the second interactive element and having received the threshold number of interactive actions indicating that the other interactive elements are selectable to perform web actions in response to the interactions by users;
   determine the similarity measure by identifying a number of similar features between the first interactive element and the second interactive element; and
   determine that the first interactive element is associated with the second interactive element based on the number of similar features exceeding a threshold number of similar features.

4. The system of claim 1, wherein the instructions, when executed by the at least one processor, further cause the system to:
   parse a document object model (DOM) for the portion of the web page to determine features of the first interactive element and to determine an element identifier;
   evaluate the features against stored features associated with other interactive elements in the data store; and
   when stored features are identified similar to the features of the first interactive element, provide the element identifier within an interactive DOM to enable the interactive DOM to receive the indirect input.

5. A computer-implemented method comprising:
   receiving a portion of interactive content comprising a first interactive element;
   determining that a second interactive element is similar to the first interactive element based at least in part on a threshold number of interactive actions being available for the first interactive element and the second interact element;
   associating a selectable option with the first interactive element, the selectable option to be invoked by an indirect input that references the selectable option to a computer;
   providing the selectable option to the computer to present to a user; and
   enabling an action associated with the first interactive element in response to the indirect input provided to the computer.

6. The computer-implemented method of claim 5, further comprising:
   receiving the portion of content as a portion of a Document Object Model (DOM) comprising the first interactive element;
   determining that the first interactive element is associated with the second interactive element when a similarity score for the first interactive element and the second interactive element is greater than a threshold score; and
   providing the selectable option to a browser of the computer for identifying interactive portions of the DOM.

7. The computer-implemented method of claim 6, further comprising:
   receiving interactions for an individual interactive element of interactive elements displayed on webpages of computers configured for direct input, wherein the interactions are recorded by software components monitoring the usage of the computers.

8. The computer-implemented method of claim 5, further comprising:
   providing a modified content to the computer, the modified content comprising at least the selectable option; and
   causing activation of the first interactive element to perform a web action in response to the indirect input for the selectable option.

9. The computer-implemented method of claim 5, wherein the indirect input is a voice command, an air action, a remote control input, motion transfer devices, or an optical input.

10. The computer-implemented method of claim 5, further comprising:
    determining an individual second interactive element of other interactive elements having at least a threshold number of interactive actions from direct input computing devices, the threshold number of interactive actions indicating that the individual second interactive element is selectable to perform an associated web action in response to an interaction by a user; and
    storing the individual second interactive element for determining similarity with the first interactive element.

11. The computer-implemented method of claim 5, wherein the action comprises: an input for initiating or transforming media; a selection of a hyperlink to an external webpage; a selection of a hyperlink to a section within the content; a selection for a web button; a selection for a cursor action; a selection for a navigation action; an input for text; or a selection for data transfer.

12. The computer-implemented method of claim 5, wherein the first interactive element and the second interactive element comprise: a banner, a graphic element, a frame, a header section, a footer section, a content slot, a search box, a web button, a form, a logo, a hyperlink, or a hover-activated section.

13. The computer-implemented method of claim 5, wherein the first interactive element and the second interactive element comprise features defining an input, a displayed media, a size specification, a style specification, or the action.

14. The computer-implemented method of claim 13, wherein the features are defined in a script.

15. The computer-implemented method of claim 5, further comprising:
determining a descriptor for the second interactive element; and
providing the descriptor as the selectable option.

16. The computer-implemented method of claim 5, further comprising:
enabling the selectable option to receive a user interaction; and
displaying the action or a result of the action.

17. The computer-implemented method of claim 5, further comprising:
receiving a first request for the content from an indirect input to the computer; and
providing a modified content to the computer, the modified content comprising the selectable option, the selectable option linked to the first interactive element.

18. A non-transitory computer-readable medium comprising instructions that, when executed by at least one processor, cause the at least one processor to:
receive a portion of interactive content comprising a first interactive element;
determine that a second interactive element is similar to the first interactive element based at least in part on a threshold number of interactive actions being available for the first interactive element and the second interactive element;
associate a selectable option with the first interactive element, the selectable option to be invoked by an indirect input that references the selectable option to a computer;
provide the selectable option to the computer to present to a user; and
enable an action associated with the first interactive element in response to the indirect input provided to the computer.

19. The non-transitory computer-readable medium of claim 18 comprising the instructions that, when executed by the at least one processor, further cause the at least one processor to:
receive the portion of content as a portion of a Document Object Model (DOM) comprising the first interactive element; and
determine that the first interactive element is associated with the second interactive element when a similarity score for the first interactive element and the second interactive element is greater than a threshold score; and
provide the selectable option to a browser for identifying interactive portions of the DOM.

20. The non-transitory computer-readable medium of claim 19 comprising the instructions that, when executed by the at least one processor, further cause the at least one processor to:
receive interactions for an individual interactive element of interactive elements displayed on webpages of computers configured for direct input, wherein the interactions are recorded by software components monitoring the usage of the computers.

* * * * *